US012792121B2

(12) United States Patent
Yang et al.

(10) Patent No.: US 12,792,121 B2
(45) Date of Patent: Nov. 10, 2026

(54) RUN-TIME MAPPING OF SERVERS WITH POWER OUTLETS OF POWER DISTRIBUTION UNITS

(71) Applicant: Super Micro Computer, Inc., San Jose, CA (US)

(72) Inventors: Ming-Gu Yang, Hsinchu (TW); Shu-Chun Yeh, Bade (TW)

(73) Assignee: SUPER MICRO COMPUTER, INC., San Jose, CA (US)

( * ) Notice: Subject to any disclaimer, the term of this patent is extended or adjusted under 35 U.S.C. 154(b) by 106 days.

(21) Appl. No.: 19/009,688

(22) Filed: Jan. 3, 2025

(65) Prior Publication Data

US 2026/0194950 A1 Jul. 9, 2026

(51) Int. Cl.
*G06F 1/28* (2006.01)
*G06F 1/26* (2006.01)

(52) U.S. Cl.
CPC ................ *G06F 1/28* (2013.01); *G06F 1/263* (2013.01)

(58) Field of Classification Search
CPC ................................... G06F 1/28; G06F 1/263
See application file for complete search history.

(56) References Cited

U.S. PATENT DOCUMENTS 8,635,484 B2 * 1/2014 Turicchi, Jr. ........... G06Q 10/06 713/340
8,661,283 B2 * 2/2014 Turicchi, Jr. ........... G06Q 50/06 713/340
8,886,985 B2 * 11/2014 Somasundaram .. G06F 11/3051 713/340
9,329,654 B2 * 5/2016 Hutten .................... G06F 1/263

* cited by examiner

*Primary Examiner* — Terrell S Johnson
(74) *Attorney, Agent, or Firm* — Morgan, Lewis & Bockius LLP

(57) ABSTRACT

This application is directed to managing power distribution in a server system. The server system identifies a plurality of servers disposed on a server rack and a plurality of power supplies configured to provide power to a plurality of servers. A plurality of power outlets are identified in the server rack, and configured to receive, and provide power to, the plurality of power supplies. The server system applies a sequential power pattern to scan the plurality of power outlets (e.g., by successively switching off the power outlets for respective plug-off durations). In response to the sequential power pattern, the server system monitors a plurality of computer power states of the plurality of servers. Based on the plurality of computer power states of the plurality of servers, the server system creates a power distribution map associating the plurality of servers, the plurality of power supplies, and the plurality of power outlets.

20 Claims, 10 Drawing Sheets

RUN-TIME MAPPING OF SERVERS WITH POWER OUTLETS OF POWER DISTRIBUTION UNITS

TECHNICAL FIELD

This application relates generally to computer technology including, but not limited to, methods, apparatuses, structures, devices, and systems for managing power distribution among a plurality of servers of a server system via multiple power outlets of one or more power distribution units (PDUs) of a server system.

BACKGROUND

Servers play a central role in powering big data and artificial intelligence (AI) applications by providing processing power, storage, and network capabilities required to manage and analyze massive volumes of data generated by various sources, including Internet of Things (IOT) devices, social media, and enterprise systems. In data centers, servers are housed within server racks, and their association with specific racks is crucial for efficient management. Existing methods for mapping servers to racks primarily rely on manual processes, such as visually inspecting server power cords and outlet connections of power distribution units (PDUs). While these methods can provide some accuracy, they are labor-intensive, time-consuming, and impractical for real-time mapping. Moreover, manual processes lack scalability and integration capabilities, making it challenging to synchronize this information with rack-scale or data center infrastructure management (DCIM) software.

SUMMARY

In accordance with some embodiments of this application disclosed herein is at least the realization that there is a need for automated solutions to streamline server-to-rack and server-to-outlet mapping, improve operational efficiency, and support dynamic data center environments that are made available by servers mounted on server racks. Various embodiments of this application are directed to methods, apparatuses, structures, devices, and systems for managing power distribution among a plurality of servers via a plurality of power outlets of one or more PDUs in a server system. The plurality of servers are disposed on one or more server racks of the server system, and the one or more PDUs of the server system are electrically coupled to power outlets fixed on the one or more server racks. Each server rack may have one or more power outlets, and each server may have one or more power supplies that can be coupled to and receive power from the power outlets of a respective server rack. In some embodiments, the plurality of servers have Internet Protocol (IP) addresses of baseboard management controllers (BMCs), and the IP addresses of the BMCs of the servers are automatically mapped to identifications of power outlets of one or more PDUs of a server rack, e.g., during a setup phase of the server rack, in real time during an operation phase of the server rack, and during a verification phase. In some embodiments, mapping of the servers and the power outlets of the server rack is implemented on each server rack. Alternatively, in some embodiments, mapping of the servers and the power outlets of the server rack is implemented across a plurality of server racks.

More specifically, in some embodiments, each power outlet of the PDU(s) of the server rack has a respective power plug state (e.g., plugged, unplugged), and each server has one or more power supplies each of which corresponds to a respective server power state (e.g., ON, OFF). Changes of the power plug states of the power outlets of the PDU(s) the server rack and the power states of the power supplies of the servers mounted on the server rack are correlated (e.g., during consecutive time slots), and applied to map the servers and their associated power supplies to the power outlets of the PDU(s) of the server rack. In some embodiments, the PDUs of the server system may have different brands and types and provide application programming interfaces (APIs) for measuring outlet power factors. In some embodiments, the servers may have different brands and types, and each server supports commands associated with an intelligent platform management interface (IPMI) or a Redfish standard associated with a respective BMC. In some embodiments, a rack-scale or data center-grade infrastructure management software is updated to integrate a program for server-rack mapping (e.g., between power supplies of a server and power outlets of PDU(s) of a server rack).

In some embodiments, a computer system creates records collecting changes of power plug states of power outlets of one or more server racks and server power states of the servers disposed on the one or more server racks. For example, each record corresponds to a respective change of a power plug state. The records of state changes are processed to build a mapping table (e.g., a power distribution map) based on a mapping method, and the mapping table is updated in real time during an operation phase of the servers. In some embodiments, the mapping table includes a server operating system state as well. In some situations, during a server rack setup phase and before collection of data, power outlets are enabled to provide power to servers via their power supplies. The power outlets are powered off successively one by one in a sequential manner, so that records of power state changes on server side and records of power plug state changes on PDU outlet side are collected and fed to a mapping algorithm to create the desired mapping table. During server rack operation phase, new records will be generated for new state changes and are fed to the mapping algorithm to update mapping table. By these means, server BMC IP addresses are mapped to PDU power outlets of the one or more server racks during both the setup and operation phases of a server system in a systematic manner. The mapping method is configurable and scalable for power supplies that have different supply brands and types and belong to different servers having different server brands and types, thereby enabling flexible integration of the power supplies with rack-scale and data center-grade management systems for device and performance monitoring.

In one aspect, some implementations include a method for managing power distribution in a server system. The method includes identifying a plurality of servers disposed on a server rack and a plurality of power supplies configured to provide power to the plurality of servers and identifying a plurality of power outlets of the server rack. The plurality of power outlets are configured to receive, and provide power to, the plurality of power supplies. The method further includes applying a sequential power pattern to scan the plurality of power outlets; in response to the sequential power pattern, monitoring a plurality of servers power states of the plurality of servers; and based on the plurality of servers power states of the plurality of servers, creating a power distribution map associating the plurality of servers, the plurality of power supplies, and the plurality of power outlets.

In some embodiments, applying the sequential power pattern to scan the plurality of power outlets further includes, while enabling the plurality of power outlets to provide power to the plurality of servers, successively switching off the plurality of power outlets for respective plug-off durations. Further, in some embodiments, each of the respective plug-off durations is less than 10 seconds, and the respective plug-off durations are included a temporal duration that is less than 10 minutes. In some embodiments, monitoring the plurality of servers power states of the plurality of servers further includes while the plurality of power outlets are successively switched off according to a switch order, determining that the plurality of servers power states of the plurality of servers successively change; and associating the plurality of servers with the plurality of power outlets based on the plurality of servers power states. Further, in some embodiments, the plurality of server power states successively change according to a response order, and the plurality of servers are associated with and mapped to the plurality of power outlets based on the switch order and the response order.

In some embodiments, each server corresponds to one or more power supplies and has a respective power state including one or more power supply states of the one or more power supplies. For each server, the power distribution map identifies a power plug state of a respective power outlet, a server identification of the respective server, a power supply count, a power supply state array including one or more power supply states of the one or more power supplies, and an operating system state of the respective server.

In another aspect, some implementations include a computer system. The computer system includes one or more processors and memory having instructions stored thereon, which when executed by the one or more processors cause the one or more processors to perform operations for implementing the method for managing power distribution in a server system as described above.

In yet another aspect, some implementations include a non-transitory servers-readable storage medium storing one or more programs, which when executed by the one or more programs cause one or more processors of a computer system to implement the method for managing power distribution in a server system as described above.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details.

Various embodiments of this application are directed to methods, apparatuses, structures, devices, and systems for managing power distribution among a plurality of servers via a plurality of power outlets of a server system. The plurality of servers are disposed on one or more server racks of the server system, and their power supplies are electrically coupled to power outlets fixed on the one or more server racks. Each server rack may have one or more power outlets, and each server may have one or more power supplies. In some embodiments, a computer system creates records collecting changes of power plug states of the power outlets of one or more server racks and changes server power states of the servers disposed on the one or more server racks. The record of state changes is processed to build a mapping table (e.g., of a power distribution map) based on a mapping method, and the mapping table is updated in real time during an operation phase of the server. Server BMC IP addresses are mapped to PDU power outlets of the one or more server racks during both the setup and operation phases of a server system in a systematic manner. The mapping method is configurable and scalable for the power supplies that have different supply brands and types on and belong to different servers having different server brands and types, thereby enabling flexible integration of the power supplies with rack-scale and data center-grade management systems for device and performance monitoring.

Figure 1:
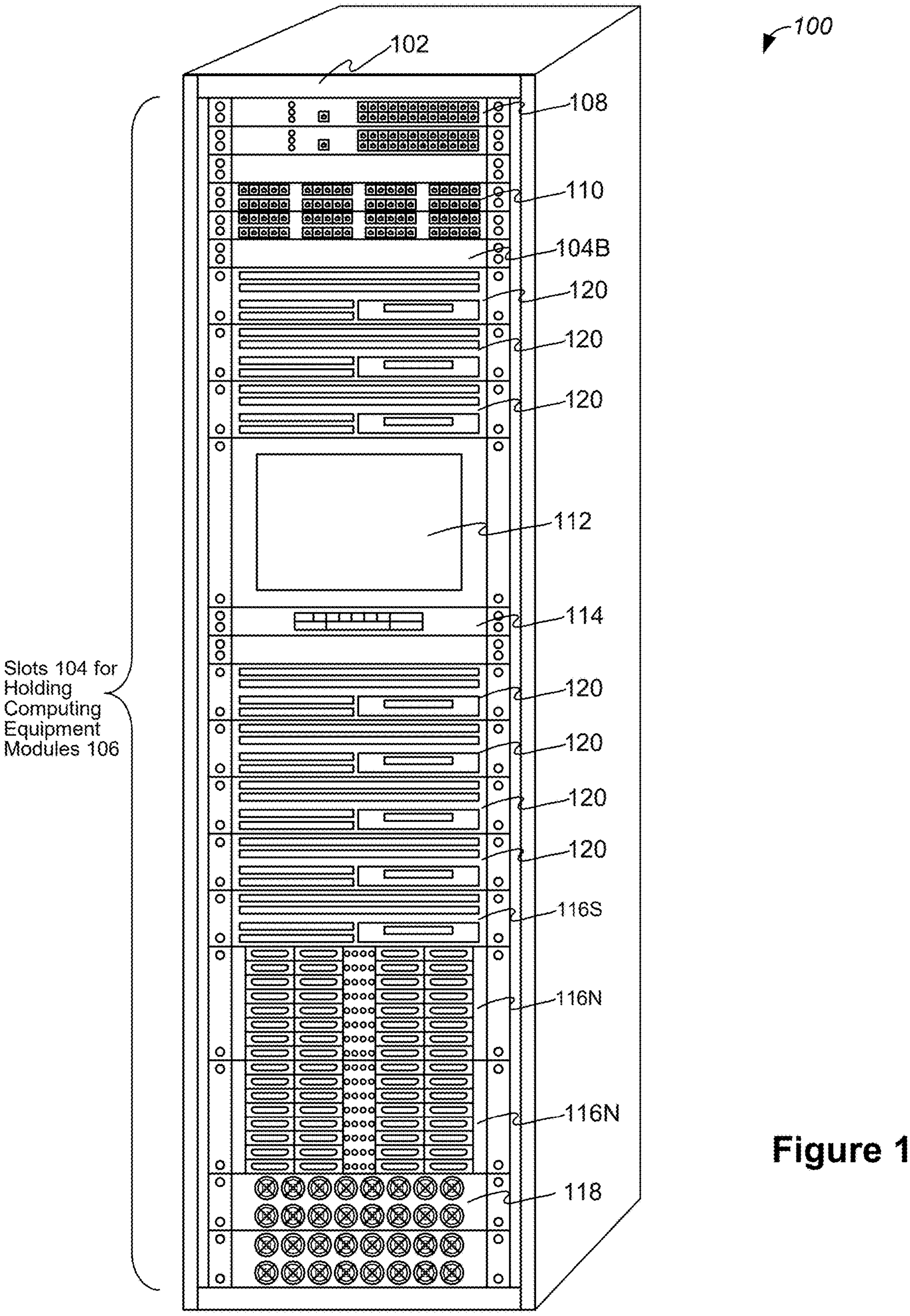
FIG. 1 is a front view of an example server rack that supports one or more servers, in accordance with some embodiments.

FIG. 1 is a front view of an example server rack 100 (also known as a rack mount, a rack cabinet, or simply a rack) that supports one or more servers 120, in accordance with some embodiments. The server rack 100 includes a frame 102 and a plurality of slots 104, and may be used in a data center, a server room, or a network closet for supporting, organizing, and managing a plurality of computing equipment modules 106 (e.g., servers 120, storage devices 116S and 116N, networking equipment, and other types of hardware). Each of the plurality of slots 104 of the server rack 100 is configured to receive and support a respective computing equipment module 106. In some embodiments, the plurality of slots 104 include at least one blank slot 104B that is not used to provide mechanical support to any equipment module 106 and can receive an equipment module 106 if needed. In some implementations, the server rack 100 has a predefined width of 19 or 23 inches, a height up to 84 inches or more, and a depth selected from 24, 32, 40, or 48 inches. A rack unit (1 U) is a standard size for a server 120 and other equipment modules 106 that are installed in the server rack 100. The server rack 100 offers room for the server 120 and other equipment modules 106, which are 19 inch wide and have heights (e.g., 1 U, 2 U, 4 U), expressed in rack units.

Examples of the computing equipment modules 106 supported by the plurality of slots 104 of the server rack 100 include, but are not limited to, a firewall module 108, a switch box 110, a server 120, a display device 112, a keyboard 114, a solid-state drive (SSD) 116S, a network-attached storage 116N, and an uninterruptible power supply (UPS) 118. Each computing equipment module 106 plays a respective role in maintaining a network and computing environment. In some embodiments, a firewall module 108 is a network security device that monitors and controls incoming and outgoing network traffic based on predetermined security rules, thereby establishing a barrier between a trusted internal network and untrusted external networks. The firewall module 108 may be placed near a network ingress point to protect the server rack 100 from unauthorized access, malware, and cyberattacks. In some embodiments, the firewall module 108 includes packet filtering, stateful inspection, VPN support, and intrusion prevention systems (IPS). In some embodiments, a switch box 110 is placed near the network ingress point jointly with the firewall module 108, and configured to receive incoming signals and forward the incoming signals (e.g., which may be converted to electrical signals) to different servers 120 mounted on the server rack 100. The switch box 110 is applied in the server rack 100 to minimize cable length and ensure efficient network traffic management. The switch box 110 may support different speeds (e.g., 800 gigabits per second (Gbps), 1.6 Tbs, 3.2 Tbs), have multiple ports (24, 48, etc.), and offer features like virtual local area network (VLAN) support, PoE (Power over Ethernet), and managed or unmanaged capabilities.

The plurality of computing equipment modules 106 of the server rack 100 may include a plurality of servers 120 each of which is configured to provides data, resources, services, or programs to other client devices over one or more wired or wireless communication networks. Each server 120 is mounted in a slot 104 of the server rack 100 and configured to provide one or more services (e.g., web hosting, database management, and application support). The servers 120, mounted on the server rack 100, may provide higher processing power, large memory capacity, redundant power supplies, and hot-swappable components for high availability and reliability compared with individual client devices. In some embodiments, the one or more rack servers 120 include a plurality of graphics processing units (GPU) configured to implement machine learning operations, e.g., in a data center associated with machine learning tasks. In some embodiments, the server 120 includes one or more processors, memory storing one or more programs for execution by the one or more processors, and a system housing for enclosing the one or more processors, the memory, and a power supply component.

The SSD 116S and the network-attached storage 116N are configured to provide storage space for the servers 120 installed in the server rack 100. The SSD uses flash memory to store data and shows high speed, low latency, durability, and lower power consumption, and diverse capacities and form factors compared to hard drive devices (HDDs). Conversely, the network-attached storage (NAS) 116N is a dedicated file storage device that provides data access to a network and allows a large number of different types of client devices to retrieve data from centralized disk capacity. In some embodiments, the network-attached storage 116N may have a high capacity, redundant array of independent disks (RAID), support for a plurality of file-sharing protocols (NFS, SMB/CIFS, FTP), user management, and backup features. In some embodiments, the SSDs 116S are storage drives for speed, and for example, used within the servers 120 disposed on the same server rack 100, while the NAS 116N is configured for file sharing, data backup, and remote access.

In some implementations, the UPS 118 is applied to provide emergency power to other computing equipment modules 106 in case of a power outage, allowing them to remain operational long enough to safely shut down or switch to an alternative power source. In an example, the UPS 118 is mounted in the server rack 100 or placed on a bottom slot to support the weight, providing backup power to other computing equipment modules 106. The UPS 118 provides one or more of battery backup, surge protection, voltage regulation, real-time monitoring, management software, and/or varying runtimes based on capacity and load.

The server rack 100 further includes a plurality of mechanical structures configured to provide mechanical support, or facilitate access, to the plurality of computing equipment modules 106. The plurality of mechanical structures include one or more of: an open frame rack (e.g., having no door or side panel), mounting rails, cable management features (e.g., arms, hooks, and trays), power strips, shelves, drawers, and blanking panels. In some embodiments, the plurality of mechanical structures also includes a rack enclosure (e.g. cabinet), lockable doors, and side panels to protect the computing equipment modules 106 from unauthorized access. In an example, the server rack 100 includes, or is coupled to, a plurality of panels configured to convert the server rack 100 to a server cabinet. In some embodiments, the server rack 100 further includes a cooling system or a ventilation system to facilitate heat dissipation. Using a server rack 100 helps optimize space, improve cooling efficiency, simplify maintenance, and enhance the overall organization and management of information technology (IT) infrastructure.

Figure 2:
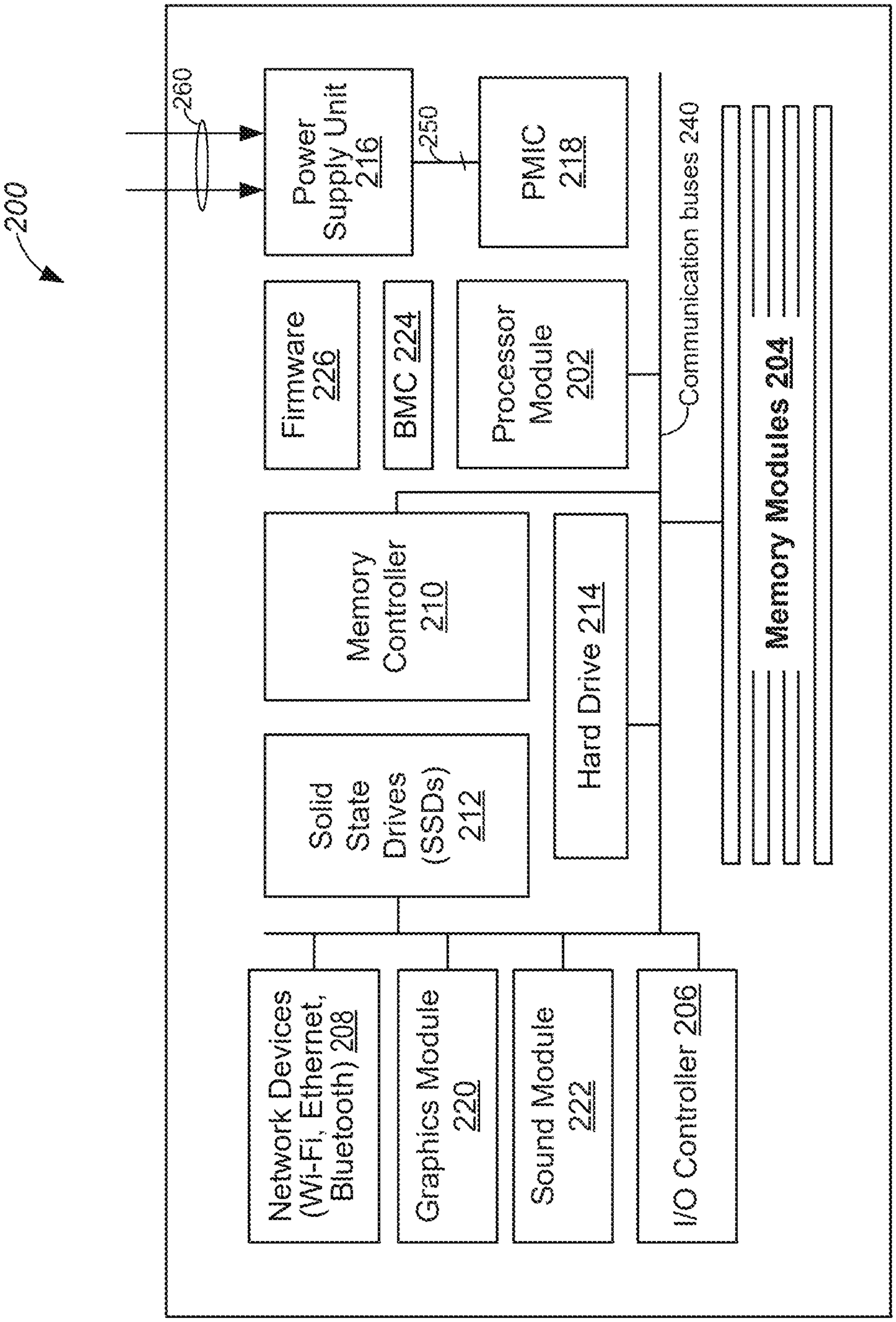
FIG. 2 is a block diagram of an example system module in a typical computer device, which may be applied as a server in FIG. 1, in accordance with some embodiments.

FIG. 2 is a block diagram of an example system module 200 in a typical electronic device, which may be applied as a server 120 in FIG. 1, in accordance with some embodiments. The system module 200 in this electronic device includes at least a processor module 202, memory modules 204 for storing programs, instructions and data, an input/output (I/O) controller 206, one or more communication interfaces such as network devices 208, and one or more communication buses 240 for interconnecting these components. In some embodiments, the I/O controller 206 allows the processor module 202 to communicate with an I/O device (e.g., a keyboard, a mouse or a track-pad) via a universal serial bus interface. In some embodiments, the network devices 208 includes one or more interfaces (e.g., for Wi-Fi, Ethernet, and Bluetooth networks) each allowing the electronic device to exchange data with another external source, e.g., a server or another electronic device. In some embodiments, the communication buses 240 include circuitry (sometimes called a chipset) that interconnects and controls communications among various system components included in the system module 200.

In some embodiments, the processor module 202 includes one or more central processing units (CPU). In some embodiments, the processor module 202 includes one or more graphics processing units (GPUs), a digital signal processor (DSP), a field-programmable gate array (FPGA), an application-specific integrated circuit (ASIC), a tensor processing unit (TPU), a microcontroller (MCU), a neural processing unit (NPU), or a combination thereof. In some embodiments, the system module 200 further includes a baseboard management controller (BMC) 224 disposed on a motherboard and for remote management (e.g., IPMI, Redfish standard). The BMC 224 is configured to provide an interface to allow administrators to monitor, troubleshoot, and update the server 120 without physical access. In some embodiments, the system module 200 further includes BIOS/UEFI firmware 226 (e.g., contained on the motherboard) configured to initialize and test hardware components during startup and provide an interface to configure hardware settings.

More specifically, in some embodiments, a network device 208 applied in a server 120 is configured to manage, route, or facilitate network traffic, enabling communication within a network or the Internet. Examples of the network device 208 include, but are not limited to an NIC (e.g., an Ethernet or Wi-Fi adapter), a network switch, a network router, a load balancer, a firewall, a wireless access point (WAP) device, a modem, a repeater node, a network hub, a network bridge, a gateway, an intrusion detection and prevention systems, and a virtual private network (VPN) appliance. In some embodiments, a subset of network devices 208 are configured to exchange data with another external source for the one or more CPUs. Alternatively and additionally, in some embodiments, a subset of network devices 208 are configured to exchange data with external sources for non-CPU processors (e.g., GPUs). In some implementations, a plurality of network devices 208 are applied in a network infrastructure of the server 120, e.g., in a data center or enterprise environment.

In some embodiments, the memory modules 204 include high-speed random-access memory, such as DRAM, static random-access memory (SRAM), double data rate (DDR) dynamic random-access memory (RAM), or other random-access solid state memory devices. In some embodiments, the memory modules 204 include non-volatile memory, such as one or more magnetic disk storage devices, optical disk storage devices, flash memory devices, or other non-volatile solid state storage devices. In some embodiments, the memory modules 204, or alternatively the non-volatile memory device(s) within the memory modules 204, include a non-transitory computer readable storage medium. In some embodiments, memory slots are reserved on the system module 200 for receiving the memory modules 204. Once inserted into the memory slots, the memory modules 204 are integrated into the system module 200.

In some embodiments, the system module 200 further includes one or more components selected from a memory controller 210, solid state drives (SSDs) 212, a hard disk drive (HDD) 214, a power supply unit (PSU) 216 (also called power supply 216), power management integrated circuit (PMIC) 218, a graphics module 220, and a sound module 222. The memory controller 210 is configured to control communication between the processor module 202 and memory components, including the memory modules 204, in the electronic device. The SSDs 212 are configured to apply integrated circuit assemblies to store data in the electronic device, and in many embodiments, are based on NAND or NOR memory configurations. The HDD 214 is a conventional data storage device used for storing and retrieving digital information based on electromechanical magnetic disks. The PSU 216 is configured to receive a plurality of power supply signals 260 and provide a plurality of DC power supplies 250 (e.g., 12V, 54V). The PMIC 218 is configured to modulate the plurality of DC power supplies 250 to other desired DC voltage levels, e.g., 5V, 3.3V or 1.8V, as required by various components or circuits (e.g., the processor module 202) within the electronic device. The graphics module 220 is configured to generate a feed of output images to one or more display devices according to their desirable image/video formats. The sound module 222 is configured to facilitate the input and output of audio signals to and from the electronic device under control of computer programs.

It is noted that communication buses 240 also interconnect and control communications among various system components including components 210-224.

Figure 3:
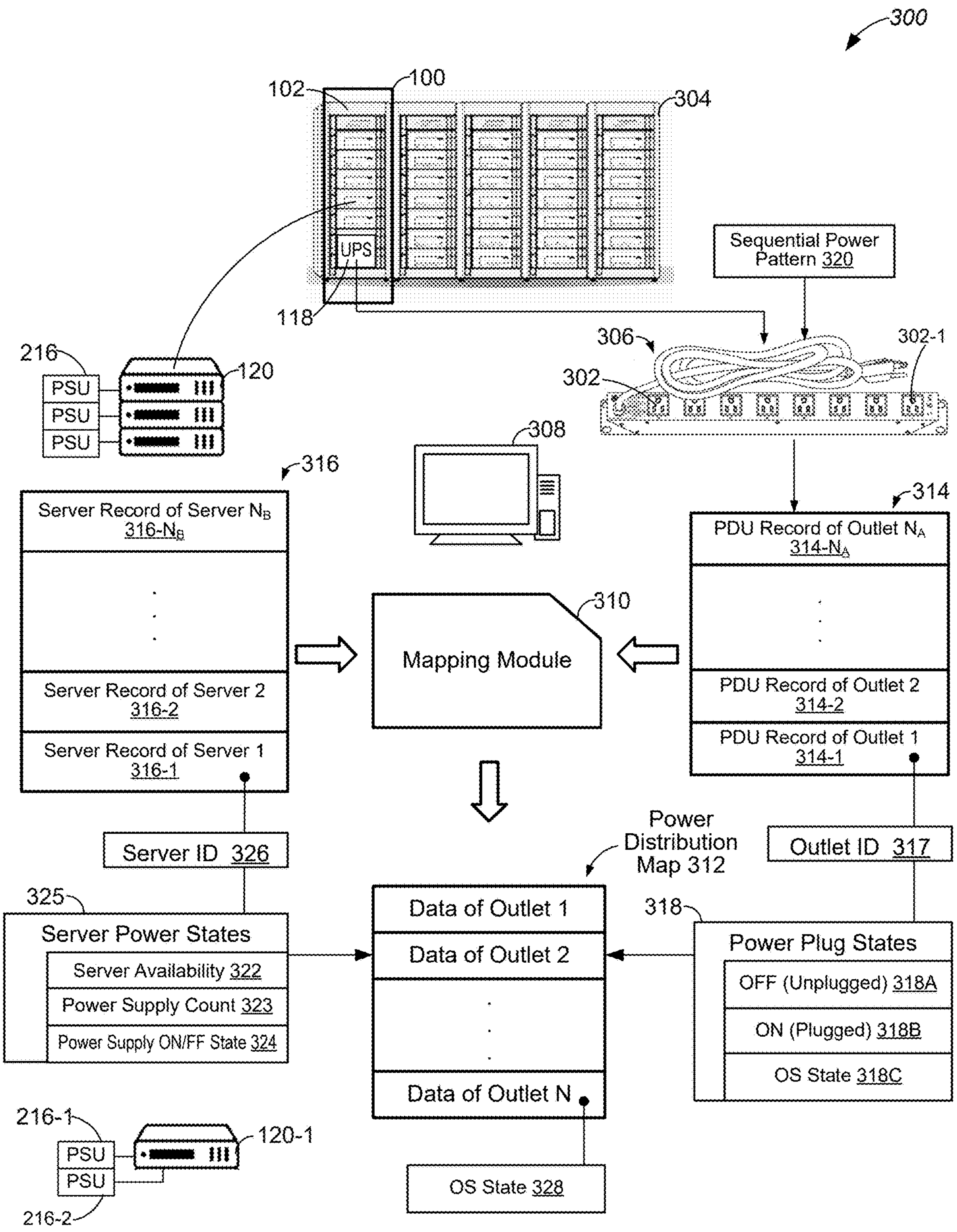
FIG. 3 is a block diagram of an example server mapping system for mapping a plurality of servers to a plurality of power outlets in a server system, in accordance with some embodiments.

FIG. 3 is a block diagram of an example server mapping system 300 for mapping a plurality of servers 120 to a plurality of power outlets 302 in a server system 304, in accordance with some embodiments. The server system 304 includes one or more server racks 100, and each server rack 100 includes a respective subset of the plurality of servers 120. Each server rack 100 further includes a plurality of power outlets 302 that may be mechanically coupled to a frame 102 of the respective server rack 100. Each server 120 further includes one or more power supplies 216 (FIG. 2), which are electrically coupled to, and configured to receive power from, a power distribution unit (PDU) 306 of a respective server rack 100. In some embodiments, the PDU 306 is coupled to, or includes, a UPS 118 installed on the server rack 100. The PDUs 306 further includes a plurality of power outlets 302. The example server mapping system 300 includes a computer device 308 coupled to, or included in, the server system 304. The computer device 308 includes a mapping module 310 configured to create a power distribution map 312 associating the plurality of servers 120 (e.g., including the plurality of power supplies 216) with the plurality of power outlets 302 of the PDU 306. In an example, the power distribution map 312 includes a mapping table.

In some implementations, the computer device 308 identifies a plurality of servers 120 disposed on a server rack 100 and a plurality of power supplies 216 (also called PSUs 216) configured to provide power to the plurality of servers 120. The computer device 308 identifies a plurality of power outlets 302 of the server rack 100, and the plurality of power outlets 302 are configured to receive, and provide power to, the plurality of power supplies 216, e.g., by way of power cords). Further, the computer device 308 applies a sequential power pattern 320 to scan the plurality of power outlets 302. In response to the sequential power pattern 320, the computer device 308 monitors a plurality of server power states 325 of the plurality of servers 120. In some embodiments, the device 308 monitors a power supply count of each server 120 or a total supply count of the plurality of servers 120.

Based on the plurality of server power states 325 of the plurality of servers 120, the computer device 308 creates the power distribution map 312 associating the plurality of servers 120, the plurality of power supplies 216, and the plurality of power outlets 302. In some embodiments, the power distribution map 312 is created automatically and without user intervention based on the plurality of server power states 325 of the plurality of servers 120.

In some embodiments, the sequential power pattern 320 are tracked in a plurality of PDU records 314-1 to 314-$N_A$ of power plug states 318 of the plurality of power outlets 302, and a plurality of server records 316-1 to 316-$N_B$ are created for the server power states 325 of the plurality of servers 120. Stated another way, the computer device 308 creates the PDU records 314-1 to 314-$N_A$ to track changes of the power plug states 318 of the power outlets 302 of one or more server racks 100, and the server records 316-1 to 316-$N_B$ to track changes of the server power states 325 of the servers 120 disposed on the one or more server racks 100. The PDU records 314-1 to 314-$N_A$ and the server records 316-1 to 316-$N_B$ of state changes are processed to build the mapping table of the power distribution map 312 during a setup phase, and the power distribution map 312 is further updated in real time during an operation phase of the servers 120. In some embodiments, the servers 120 include the power supplies 216 (e.g., associated with BMC IPs), and the power supplies 216 are mapped to the power outlets 302 of the one or more server racks 100 during both the setup and operation phases of a server system 304 in a systematic manner. In some situations, order of records on a server side and a PDU side may not coincide due to connection of server power supplies 216 and PDU outlets 302 may cross and not follow sequential positions. Records of state changes are collected on the server side and the PDU side for mapping.

Referring to FIG. 3, in some embodiments, a first server 120-1 includes two power supplies 216-1 and 216-2 identified by a single BMC IP addresses, and in accordance with the power distribution map 312, a first power supply 216-1 has an active state for providing power to the first server 120-1 and a second power supply 216-2 has a standby state. One of the two power supplies 216-1 and 216-2 is redundant. Alternatively, a first server 120-1 includes two power supplies 216-1 and 216-2 identified by two distinct IP addresses, and in accordance with the power distribution map 312, the two power supplies 216-1 and 216-2 have active states for providing power jointly to the first server 120-1. The two power supplies 216-1 and 216-2 may operate independently of each other.

In some embodiments, the PDU records 314-1 to 314-$N_A$ are configured to track changes of the power plug states 318 of the power outlets 302 of one or more server racks 100. Each server rack 100 includes a plurality of power outlets 302. Each PDU record 314 corresponds to a respective power outlet 302. In an example, a first PDU record 314-1 of a first power outlet 302-1 includes a power factor having a value of zero representing an OFF (UNPLUGGED) state 318A and a non-zero value (e.g., 1, close to 1, between 0 and 1) representing an ON (PLUGGED) state 318B. In accordance with detection of a change of the power factor between the value of zero and the non-zero value, the computer device 308 determines that the first power outlet 302-1 has changed its state. In an example, a first server 120-1 (specifically, a first power supply 216-1 of the first server 120-1) has been plugged onto, and electrically powered by, the first power outlet 302-1. In some other embodiments, a first PDU record 314-1 of a first power outlet 302-1 includes a power factor having a first value representing an OFF (UNPLUGGED) state 318A and a second distinct value representing an ON (PLUGGED) state 318B. A change of the power factor is monitored.

In some embodiments, the server records 316-1 to 316-$N_B$ are configured to track changes of the server power states 325 of the servers 120 disposed on the one or more server racks 100. Each server record 316 may correspond to a server power state 325 of a respective server 120. In some embodiments, each server 120 includes one or more power supplies 216 associated with one or more respective server records 316, and each server record 316 corresponds to a server power state 325 of a respective power supply of a respective server 120. For example, a first server record 316-1 of a first power supply 216-1 of a first server 120-1 includes an indicator for server availability 322 of the first server 120-1, a power supply count 323 of the first server 120-1, and an ON/OFF state 324 of the first power supply 216-1 of the first server 120-1. The indicator for server availability 322 applies to a plurality of server records 316 associated with all power supplies of the first server 120-1 including the first power supply 120-1. The ON/OFF state 324 of the first power supply 216-1 is detected via IPMI/Redfish commands when the first server 120-1 is reachable. In accordance with detection of a change of the indicator of the server availability 322 and the ON/OFF state 324 of the first power supply 216-1 of the first server 120-1, the computer device 308 determines whether the first power supply 216-1 of the first server 120-1 has changed, e.g., been plugged onto, and electrically powered by, a corresponding power outlet 302 (e.g., the first power outlet 302-1). When the first server record 316-1 changes in response to a change of the first PDU record 314-1, the first power supply 216-1 of the first server 120-1 is associated with the first power outlet of the PDU 306 in the power distribution map 312. Stated another way, in some embodiments, such an association also applies to an unplugged case. Plugged and unplugged states can be caused by either physically connecting and disconnecting the power cord or by turning on and off the power state of the PDU power outlet via PDU commands.

In some embodiments, the power distribution map 312 is created by proactively introducing state changes to the power outlets 302 of the PDU 306 of a server rack 100. For example, the plurality of power outlets 302 are controlled between the ON state 318B and the OFF state 318A, thereby generating the PDU records 314 to reflect the changes of the power plug states 318 of the power outlets 302 of the server rack 100. The plurality of power outlets 302 are successively controlled to establish a temporally-ordered sequence of the PDU records 314-1 to 314-$N_A$. When the power supplies 216 of the servers 120 respond to the changes of the power plug states 318 of the power outlets 302, the computer device 308 detects a temporally-ordered sequence of the server records 316 corresponding to the temporally-ordered sequence of the PDU records 314-1 to 314-$N_A$, allowing the servers 120 and their associated power supplies 216 to be mapped to the power outlets 302 of the PDU 306. In some embodiments, a polling mechanism is applied during respective polling intervals to detect changes of the power plug states 318 and changes of the server power states 325 that follow the changes of the power plug states 318 of the power outlets 302. In some embodiments, the changes of the server power states 325 of the servers 120 and the changes of the power plug states 318 of the power outlets 302 are detected with different polling granularities. In other words, the server power states 325 of the servers 120 tracked in the server records 316 and the power plug states 318 of the power outlets 302 tracked in the PDU records 314 may be monitored with distinct sampling frequencies.

In some embodiments, after detecting the changes of the server power states 325 of the servers 120 tracked in the server records 316, the computer device 308 creates the power distribution map 312 mapping the servers 120 and associated power supplies 216 to the power outlets 302 of the server system 304. In some embodiments, the power distribution map 312 associates information of the servers 120 and associated power supplies 216 (e.g., server identification (ID) 326, a power supply count, power supply index) with information of the power outlets 302 of the server system 304 (e.g., operating system (OS) state 328, outlet number, outlet ID 317). Further, in some embodiments, after the power distribution map 312 is set up, the power distribution map 312 may be dynamically updated, when a subset of the power outlets 302U (FIG. 8) is controlled to toggle or alternate between the ON state 318B and the OFF state 318A. In some situations, the computer device 308 executes a program to control the power plug states 318 of the power outlets 302. Alternatively, in some situations, an administrator manually turns the power outlets 302 on or off or changes connections of power cords to the power supplies 216 and the power outlets 302 during an operation phase.

In some embodiments, the computer device 308 executes a server management application including the mapping module 310 to manage operations of the plurality of servers 120 of the server system 304. For example, the servers 120 are equipped with BMCs that are configured to implement IPMIs, and the computer device 308 interacts with the IPMIs to monitor states (e.g., voltage, temperature, and operational health, sensor type, identifications, entities, readings, and events) of the power supplies 216 of the servers 120, control power remotely (e.g., power servers on and off), and check for power redundancy and failures in redundant power supply configurations. In another example, the computer device 308 executes a proprietary software tool for power supply monitoring, thereby measuring real-time power consumption metrics, monitoring health of power supplies, fans, and other components, and creating event notifications for power supply failure or inefficiencies. In yet another example, the computer device 308 executes a Redfish API for querying detailed power consumption data, controlling power operations and settings, and integrating power management into broader orchestration platforms. In some embodiments, the power supplies 216 are applied with a power management bus (PMBus) to report input/output power levels, efficiency metrics, or fault or warning conditions. In some embodiments, the computer device 308 applies a web-based interface supported by the BMCs, and may visualize power consumption trends, notify a user of overloading or power failures, or manage power redundancy modes. Some implementations of this application include a power distribution application to which the plurality of servers 120 report the plurality of server power states 325 and the PDU 306 reports the plurality of power plug states 318.

Figure 4:
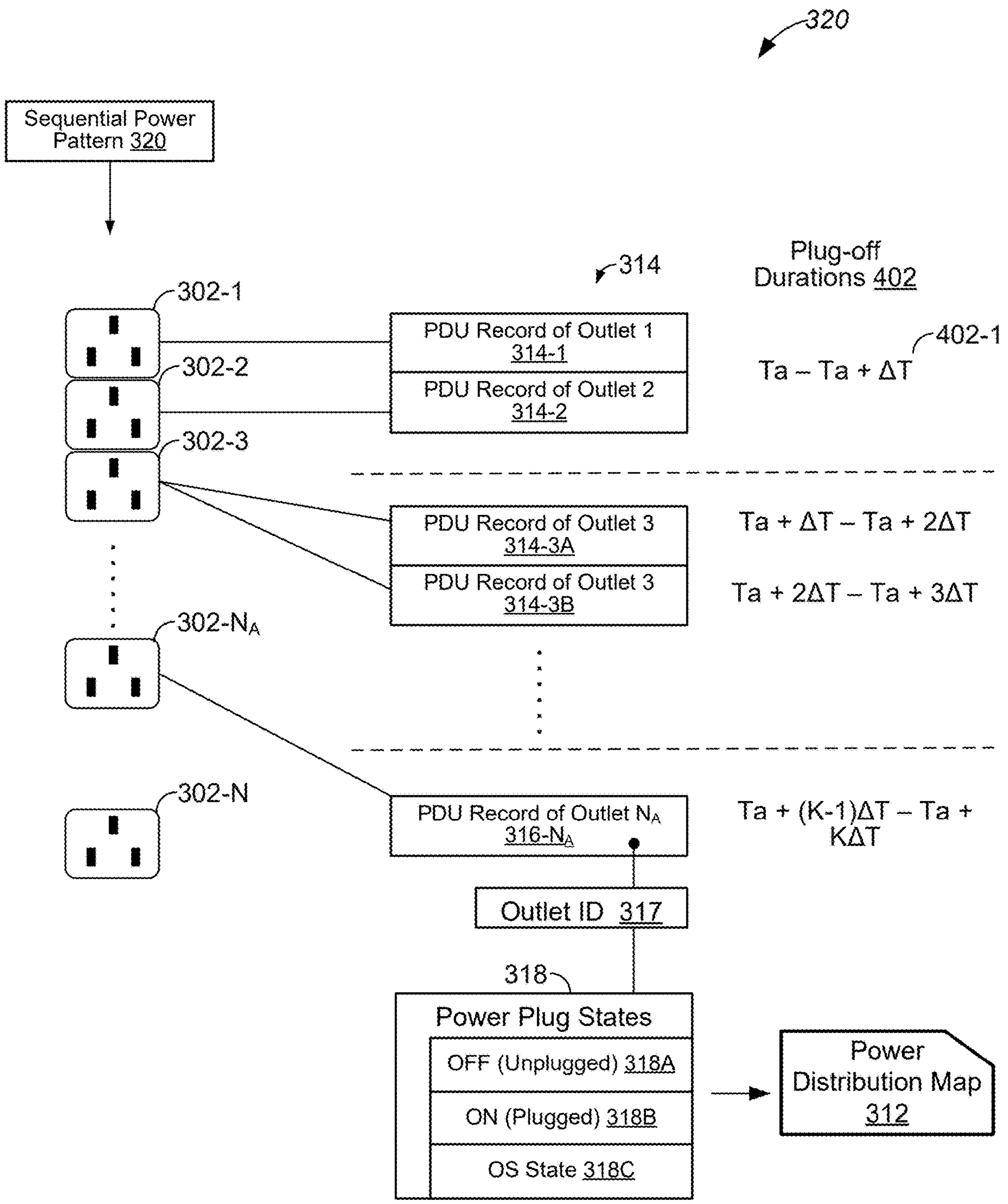
FIG. 4 is a schematic diagram of an example sequential power pattern for scanning a plurality of power outlets of a server rack, in accordance with some embodiments.
Figure 5:
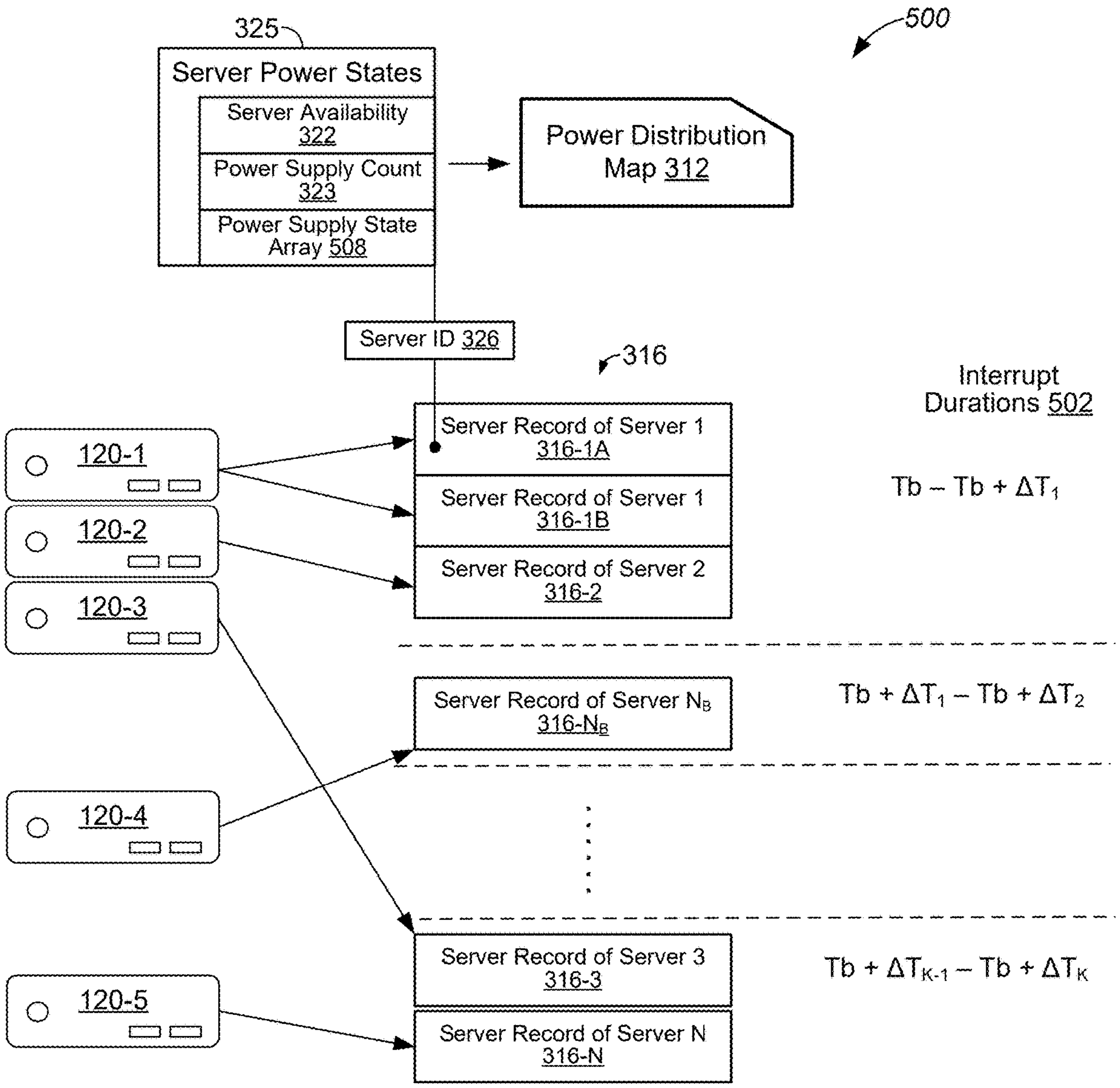
FIG. 5 is a schematic diagram of an example sequential response pattern for a plurality of power supplies of a plurality of servers mounted on a server rack, in accordance with some embodiments.

FIG. 4 is a schematic diagram of an example sequential power pattern 320 for scanning a plurality of power outlets 302 of a server rack 100, in accordance with some embodiments, and FIG. 5 is a schematic diagram of an example sequential response pattern 500 for a plurality of power supplies 216 of a plurality of servers 120 mounted on a server rack 100, in accordance with some embodiments. A computer device 308 identifies the plurality of servers 120 disposed on the server rack 100 and the plurality of power supplies 216 configured to provide power to the plurality of servers 120. The computer device 308 identifies a plurality of power outlets 302 of the server rack 100, and the plurality of power outlets 302 are configured to receive, and provide power to, the plurality of power supplies 216. The sequential power pattern 320 is applied to scan the plurality of power outlets 302, and tracked in a plurality of PDU records 314. In response to the sequential power pattern 320, the computer device 308 monitors a plurality of server power states 325 of the plurality of servers 120 in a plurality of server records 316. Based on the plurality of server power states 325 of the plurality of servers 120, the computer device 308 creates a power distribution map 312 mapping the plurality of servers 120 and the plurality of power supplies 216 to the plurality of power outlets 302.

Referring to FIG. 4, in some embodiments, the plurality of power outlets 302 (e.g., power outlets 302-1 to 302-$N_A$) of the server system 304 are powered on, and successively switched off for respective plug-off durations 402 based on the sequential power pattern 320. In some embodiments, the respective plug-off durations 402 have varying temporal lengths for the plurality of power outlets 302. Alternatively, in some embodiments, the respective plug-off durations 402 have a fixed temporal length for the plurality of power outlets 302. In some embodiments, the respective plug-off durations 402 have varying temporal separations. In some embodiments, the respective plug-off durations 402 have a fixed non-zero temporal separation. In some embodiments, two successive plug-off durations 402 have substantially no temporal separation. In an example, a first power outlet 302-1 is powered off during a first plug-off duration 402-1 of Ta to Ta+ΔT, i.e., disabled from providing power at a time Ta and enabled back to provide power at a subsequent time Ta+ΔT. A third power outlet 302-3 is powered off during a second plug-off duration of Ta+ΔT to Ta+2 ΔT, and an $N_A$-th power outlet 302-$N_A$ is powered off during a K-th plug-off duration of Ta+(K−1)ΔT to Ta+KΔT. Alternatively, in some embodiments, when PDU outlets are switched off successively (e.g., not concurrently), a first PDU outlet is switched off earlier than a second PDU outlet, and neither of these two PDU outlets causes unreachability of any server 120. It is determined that these two outlets (previous switched-off and current switched-off) are connected to two power supplies of a server 120, which is equipped with three or more power supplies.

In some embodiments, two or more power outlets (e.g., outlets 302-1 and 302-2) are powered off concurrently during the same plug-off duration 402 (e.g., the first plug-off duration 402-1).

In some embodiments, each of the respective plug-off durations 402 is less than 10 seconds, and the respective plug-off durations 402 are included a temporal duration (e.g., from Ta to Ta+KΔT), which is less than 10 minutes.

Additionally, in some embodiments, the server system 304 may include at least a redundant power outlet 302-N that is not connected to any power supply 216 of the servers 120 of the server system 304, and the redundant power outlet 302-N is not scanned in the sequential power pattern 320.

In some embodiments, the sequential power pattern 320 is applied to the plurality of power outlets 302 of the server system 304, and each of the plurality of power outlets 302 has a power plug state 318 including one of (1) not plugged 318A and (2) plugged 318B with one of a plurality of power factors (PFs) (e.g. a low power factor state having a first power factor, a high power factor state having a second power factor greater than the first power factor). The power plug states 318 of the plurality of power outlets 302 are tracked and stored in a plurality of PDU records 316-1 to 316-$N_A$. An example PDU record 314 of a corresponding power outlet 302 is represented as follows:

```
PDU_Record = {
  Outlet Plug State
}
Outlet Plug State = enum {
  Not plugged,
  Plugged with Lower PF;
  Plugged with Higher PF;
}
```

A change of the PDU plug state may denote a transition of the PDU record 314 between two consecutive plug-off durations 402. For example, the third power outlet 302-3 is powered off in two consecutive plug-off durations of Ta+ΔT to Ta+2ΔT and Ta+2ΔT to Ta+3ΔT, and correspond to two PDU records 314-3A and 314-3B. In an example, the PF has a relatively low value close to 0 (e.g., less than 0.5, equal to 0.2), indicating an OS OFF state. In another example, the PF has a relatively high value close to 1 (e.g., greater than 0.5, equal to 0.7) indicating an OS ON state.

Referring to FIG. 5, in some embodiments, when the plurality of power outlets 302 of the server system 304 are successively switched off for respective plug-off durations 402, the power supplies 216 of the plurality of servers 120 are turned off and back on successively, and operation of the plurality of servers 120 is disrupted successively during respective interrupt durations 502. Each respective interrupt duration 502 of a respective server 120 is temporally shifted with respect to an associated plug-off duration 402 of a respective power outlet 302, and the respective interrupt durations 502 may have varying lengths. In some embodiments, the respective interrupt durations 502 successively follow one another. Alternatively, in some embodiments, two of the respective interrupt durations 502 are separated by a temporal gap. Independently of the lengths of the interrupt durations 502 of the plurality of servers 120, an order of the servers 120 being interrupted follows an order of the power outlets 302 being powered off, thereby allowing the servers 120 to be associated with the power outlets 302. In other words, in some embodiments, a plurality of server power states 325 of the plurality of servers 120 are tracked in the server records 316. While the plurality of power outlets 302 are successively switched off according to a switch order, the plurality of server power states 325 of the plurality of servers 120 successively change. The plurality of servers 120 are associated with the plurality of power outlets 302 based on the plurality of server power states 325 (e.g., their associated changes). In some embodiments, the plurality of server power states 325 successively change according to a response order, and the plurality of servers 120 are associated with and mapped to the plurality of power outlets 302 based on the switch order and the response order.

In an example, operation of a first server 120-1 and a second server 120-2 is disrupted during a first interrupt duration of Tb to Tb+$\Delta T_1$. The first server 120-1 has two power supplies 216 corresponding to two server records 316-1A and 316-1B, and the second server 120-2 has a single power supply 216 corresponding to a server record 316-2. Operation of an $N_B$-th server 120-4 is disrupted subsequently to the servers 120-1 and 120-2 during a second interrupt duration of Tb+$\Delta T_1$ to Tb+$\Delta T_2$, and operation of a third server 120-3 and an N-th server 120-5 is disrupted subsequently to the server 120-4 during a K-th interrupt duration of Tb+$\Delta T_{K-1}$ to Tb+$\Delta T_K$. Particularly, in some embodiments, the first power outlet 302-1 and the second power outlet 302-2 are switched off concurrently during the first plug-off duration Ta to Ta+ΔT. Two power states 325 of the servers 120-1 and 120-2 are thereby monitored (e.g., in server records 316-1A, 316-1B, and 316-2) in response to switching off the power outlets 302-1 and 302-2 concurrently. Operation the first server 120-1 and the second server 120-2 is disrupted during the first interrupt duration of Tb to Tb+$\Delta T_1$ based on the server records 316-1A, 316-1B, and 316-2. The power outlets 302-1 and 302-2 are determined to be connected to power supplies 216 of first server 120-1 and the second server 120-2, respectively.

In some embodiment not shown, the first power outlet 302-1 and the second power outlet 302-2 may be switched off during the same plug-off duration 402, and operations the same first server 120-1 may be disrupted during a corresponding interrupt duration 502 based on a server record 316 of the first server 120-1. The first power outlet 302-1 and the second power outlet 302-2 may be switched off during two distinct plug off durations 402 (consecutive or not), and operations the same first server 120-1 are disrupted during two distinct corresponding interrupt durations 502 based on two server records 316 of the first server 120-1. The power outlets 302-1 and 302-2 are determined to be connected to two power supplies 216 of the first server 120-1.

In some embodiments, each server 120 corresponds to one or more power supplies 216 and has a respective server power state 325 including one or more power supply states of the one or more power supplies 216. For each server 120, the server record 316 identifies a server ID 326 (e.g., server IP address), a reachability state 322 (also called server availability), a power supply count 323 (e.g., a total number of the one or more power supplies), and a power supply state array 508 including the one or more power supply states 324. Further, in some embodiments, the power supply state array 508 includes a Boolean array in a size equal to the power supply count 323. For example, the first server 120-1 has three power supplies 216 each of which has a single bit power supply state 324. The power supply state array 508 includes 3 bits each representing a power supply state 324 of a respective power supply 216 of the first server 120-1. An example server record 316 of a corresponding server 120 is represented as follows:

```
Server_Record = {
  Server IP,
  Server Reachability,
  Power Supply Count,
  Power Supply States Array
}
```

Referring back to FIG. 3, in some embodiments, the power distribution map 312 maps the plurality of servers 120 and the plurality of power supplies 216 with the plurality of power outlets 302. A data record of the power distribution map 312 corresponds to a change of a power outlet state of a corresponding power outlet 302, and consolidates information of the servers 120, associated power supplies 216, and the power outlets 302 of the server system 304 (e.g., operating system (OS) state 328, outlet number, outlet ID 317), and for instance, is represented as follows:

```
PDU_Outlet_Data_Record = {
  Power Plug State,
  Server IP,
```

-continued

```
    Power Supply Count,
    Power Supply Index,
    OS State
}
OS State = enum {
    On,
    Off
}
```

Each data record of the power distribution map 312 combines a power plug state 318 of a respective power outlet 302 with a server power state 325 of a respective server 120 including one or more power supplies 216. In some embodiments, each data record of the power distribution map 312 further includes an operating system state 328 indicating whether an operating system is loaded on the respective server 120. Stated another way, in some embodiments, for each plug-off duration 402, the power distribution map 312 identifies a power plug state 318 of a respective power outlet 302, a server ID 326 of a respective server 120, a power supply count 323, a power supply state array 508 including one or more power supply states 324 of the one or more power supplies 216, and the operating system state 328. The respective server 120 is thereby associated with the respective power outlet 302 based on the power distribution map 312.

Figure 6:
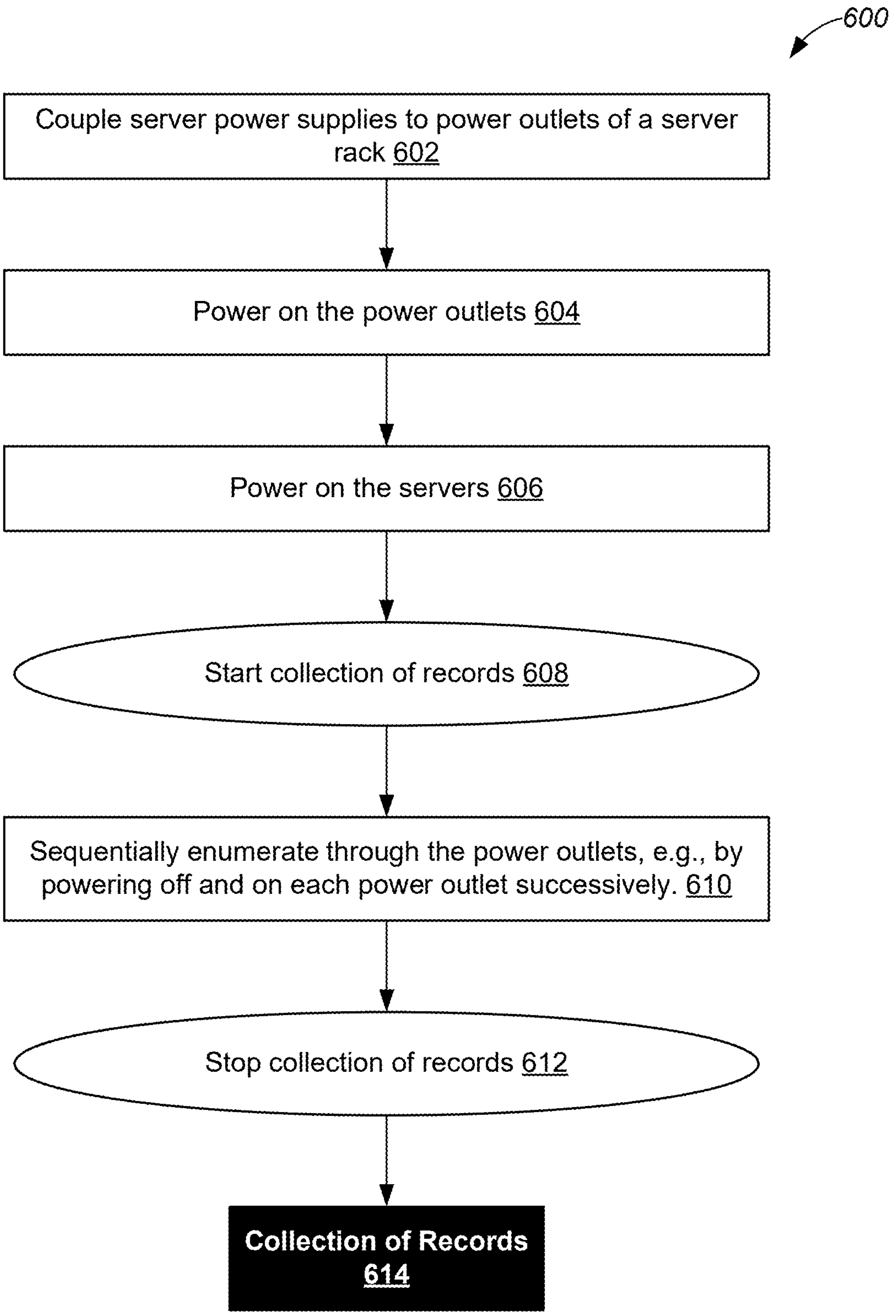
FIG. 6 is a flow diagram of an example server controlling process for mapping a plurality of servers to a plurality of power outlets in a server rack, in accordance with some embodiments.

FIG. 6 is a flow diagram of an example server controlling process 600 for mapping a plurality of servers 120 to a plurality of power outlets 302 in a server rack 100, in accordance with some embodiments. The plurality of servers 120 have a plurality of power supplies 216 (also called PSU 216), and each server 102 has a respective subset of one or more power supplies 216. The servers 120 are disposed on the server rack 100, and the plurality of power supplies 216 are mechanically and electrically coupled (operation 602) to the plurality of power outlets 302 of the server rack 100. In some embodiments, a server 120 may have a redundant power supply 216 that is not plugged into a respective power outlet 302. In some embodiments, the server rack 100 includes a redundant power outlet 302 that is not connected to any power supply 216 of the servers 120. The plurality of power supplies 216 that are coupled to the plurality of power outlets 302 are turned on (operation 604) to provide power (operation 606) to the plurality of power supplies 216, which further powers operations of the plurality of servers 120. The process 600 is implemented to trigger power transition of power outlets to collect records of states changes on both server and PDU sides. Rationale here is switching off a power outlet will shut down a server power supply that's connected to it. Once all the power outlets connected to a server's all power supplies are switched off, the server will turn unavailable (unreachable). Server power states records will flag this as well as power state array. The power outlets can be associated with server by cross checking with power plug states records.

While the plurality of power outlets 302 are enabled to provide power to the plurality of servers 120, a computer device 308 starts to collect (operation 608) a plurality of PDU records 314 of the plurality of power outlets 302 and a plurality of server records 316 of the servers 120. The plurality of power outlets 302 are enumerated (operation 610) sequentially according to a sequential power pattern 320. For example, each of the plurality of power outlets 302 (e.g., power outlets 302-1 to 302-$N_A$) of the server system 304 is powered on and off for respective plug-off durations 402, which are sequentially arranged without any overlapping. In some embodiments, the respective plug-off durations 402 have temporal separations, such that resulting interrupt durations 502 of the servers do not overlap. Alternatively, in some embodiments, the respective plug-off durations 402 have no or substantially small temporal separations, and the resulting interrupt durations 502 of the servers do not or may slightly overlap while remaining differentiable from one another. After the sequential power pattern 320 is enumerated entirely, the plurality of PDU records 314 of the plurality of power outlets 302 and the plurality of server records 316 of the servers 120 are collected (operation 612), thereby providing a collection 614 of PDU records 314 and server records 316.

In some embodiments, the server mapping process 600 is implemented to obtain a state change record when a switch between ON and OFF states is detected. The plurality of PDU records 314 of the plurality of power outlets 302 are sequentially ordered, so are the plurality of server records 316 of the servers 120 generated in response to implementation of the sequential power pattern 320. The power plug states 318 are detected based on the plurality of PDU records 314 based on a first polling mechanism, the server power states 325 are detected based on the plurality of server records 316 based on a second polling mechanism. In accordance with the first and second pooling mechanisms, a computer device 308 (FIG. 3) continuously checks the status of the power supplies 216 of the servers 120 and the power outlets 302 of the PDU 306, e.g., by sending requests or queries to the servers 120 and the PDU 306, waiting for a response, and repeating this process in a loop until desired power plug states 318 and server power states 325 are obtained. The first pooling mechanism applied on the power outlets 302 have a first pooling interval for detecting changes of power plug states 318, and the second pooling mechanism applied on the power supplies 216 of the servers 120 have a second pooling interval for detecting changes of server power states 325. In some embodiments, the first pooling interval is distinct, and has a different granularity, from the second pooling interval.

Figure 7:
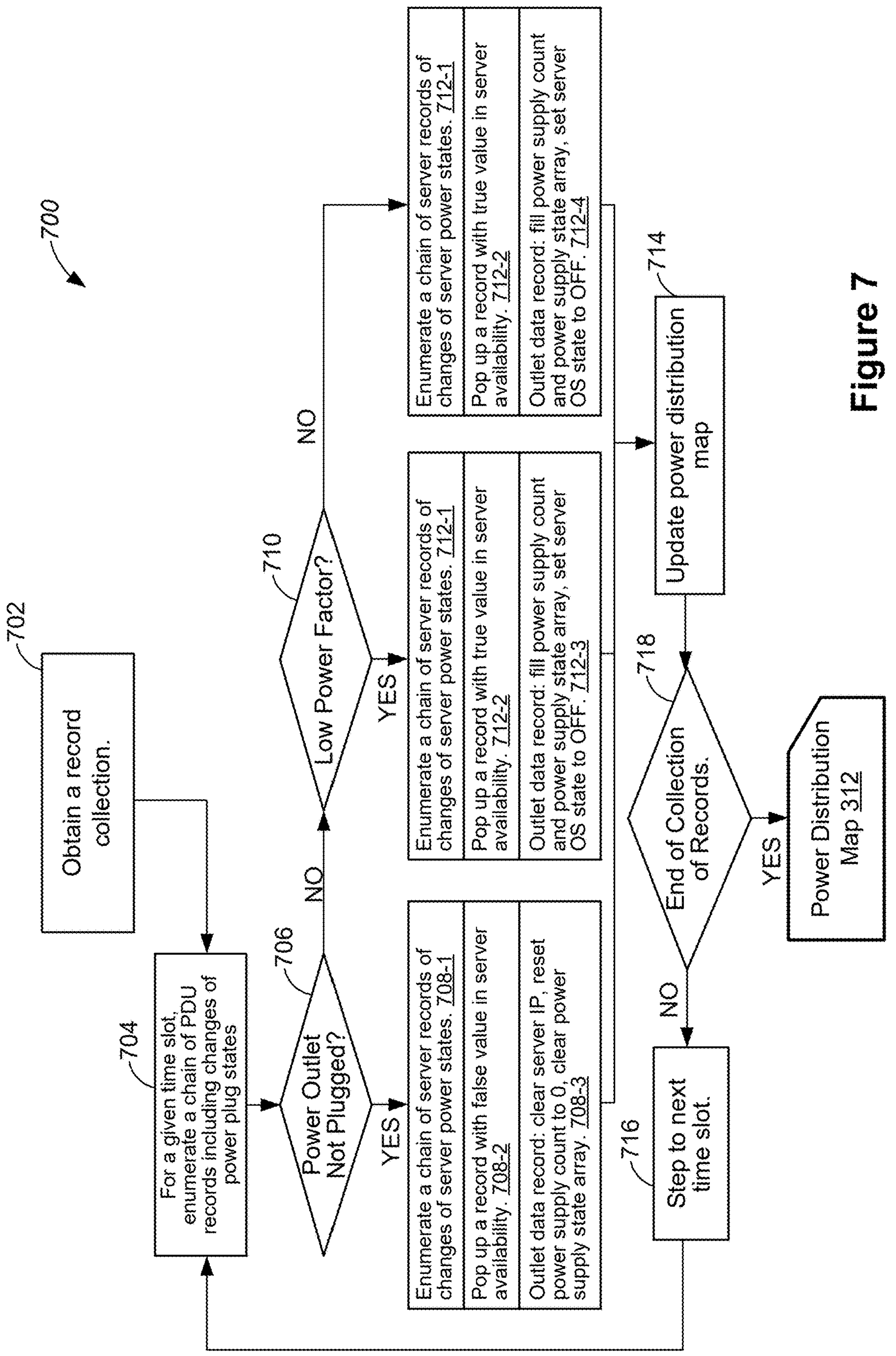
FIG. 7 is a flow diagram of an example server mapping process for creating a mapping table as a power distribution map based on a record collection, in accordance with some embodiments.

FIG. 7 is a flow diagram of an example server mapping process 700 for creating a mapping table as a power distribution map 312 based on a record collection 614, in accordance with some embodiments. The collection 614 includes a plurality of PDU records 314 of a plurality of power outlets 302 of a server system 304 and a plurality of server records 316 of a plurality of servers 120 installed on one or more server racks 100 in the server system 304. The mapping table of the power distribution map 312 associates the power outlets 302 with the servers 120 and their associated power supplies 216, thereby associating the PDU records 314 with the server records 316. In an example, for each power outlet 302, the power distribution map 312 identifies one or more of: a power outlet identification 317, a server ID 326, a power supply count 323, power supply identification(s), and an operating system state 328.

In some embodiments, a computer device 308 obtains (operation 702) the record collection 614. For a given time slot (e.g., a plug-off duration of Ta to Ta+$\Delta$T), the computer device 308 enumerates (operation 704) a chain of PDU records 314 including changes of the power plug states 318, and determines (operation 706) whether a power cord associated with a power supply of a server 120 is plugged into a first power outlet 302-1. In accordance with a determination that a power cord is not plugged into the first power outlet 302-1, the computer device 308 enumerates (operation 708-1) a chain of server records 316 including changes of server power states 325 and presents (operation 708-2) a record 316 having a false value associated with server availability 322 (FIGS. 3 and 5). The computer device 308 does not associate (operation 708-3) any sever record 316 with the first power outlet 302-1, e.g., by clearing server identification 326 and power supply state array 508, resetting the power supply count 323 to 0.

In some embodiments, the computer device 308 determines that a power cord is plugged into the first power outlet 302-1, and further determines (operation 710) whether the first server 120-1 coupled to the first power outlet 302-1 via the power cord has one of a plurality of power factors (e.g. a low power factor state having a first power factor, a high power factor state having a second power factor greater than the first power factor). Further, in some embodiments, the computer device 308 determines that the first server 120-1 has a low power factor state in which a ratio of working power and allocated power is below a threshold power factor value, indicating an operating system is not executed on the first server 120-1. Alternatively, in some embodiments, the computer device 308 determines that the first server 120-1 has a high power factor state in which a ratio of working power and allocated power is above the threshold power factor value, indicating an operating system is executed on the first server 120-1. At both of the low power factor state and the high power factor state, the computer device 308 enumerates (operation 712-1) a chain of server records 316 including changes of server power states 325 and presents (operation 712-2) a record 316 having a true value associated with server availability 322 (FIGS. 3 and 5). The computer device 308 associates (operations 712-3 and 712-4) a first sever record 316 of the first server 120-1 with the first power outlet 302-1 of the first power outlet 302-1, e.g., by filling server identification 326, power supply state array 508, and the power supply count 323 to 0. The operating system state 328 is set (operation 712-3) to OFF at the low power factor state. In the high power factor state, the operating system state 328 is set (operation 712-4) to ON at the high power factor state. As such, the computer device 308 may create or update (operation 714) an entry of the power distribution map 312 corresponding to the given time slot (e.g., the plug-off duration of Ta to Ta+ΔT).

The computer device 308 processes (operation 716) the PDU records 314 and the server records 316 corresponding to different durations 402 and 502 that are subsequent to the given time slot (e.g., the plug-off duration of Ta to Ta+ΔT) successively, until the computer device reaches (operation 718) an end of the record collection 614. The power distribution map 312 is created to map the plurality of PDU records 314 to the plurality of server records 316 and associated the plurality of servers 120 and their associated power supplies 216 with the plurality of power outlets 302 of the PDU 306 of the server system 304. In some embodiments, processing of PDU records and server records in the computer device 308 may go either sequentially in a single thread or concurrently in parallel threads. Time granularities (e.g., associated with sampling frequencies) in PDU records and server records are independent.

Figure 8:
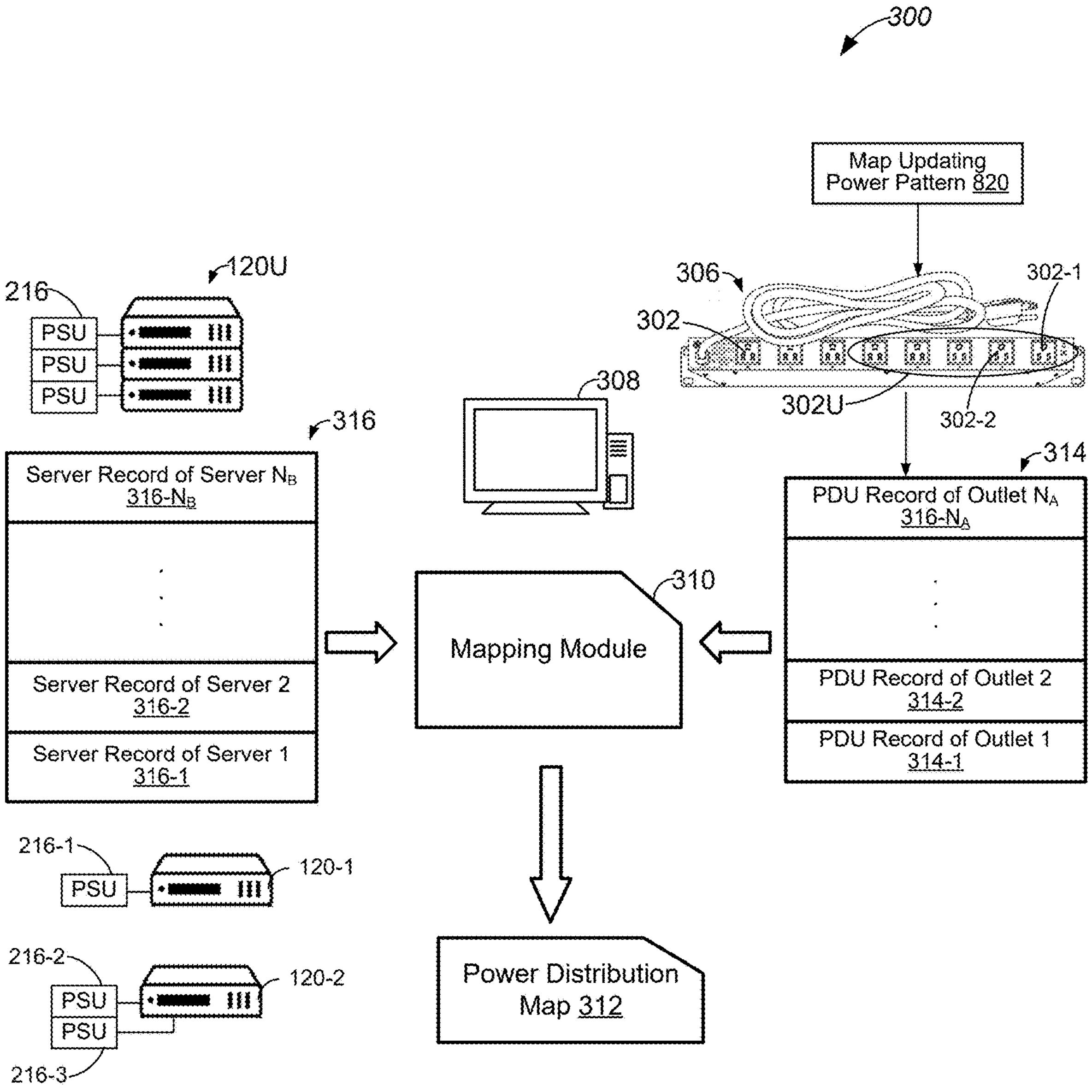
FIG. 8 is a block diagram of an example server mapping system in which a power distribution map is updated during a runtime for a server system 304, in accordance with some embodiments.

FIG. 8 is a block diagram of an example server mapping system 300 in which a power distribution map 312 is updated during a runtime for a server system 304, in accordance with some embodiments. An update is required when either connections of server power supplies with power outlets are altered or power states of server power supplies and PDU outlets get changed. The power distribution map 312 is created during a setup phase of a server system 304, and may be dynamically updated during an operation phase of the server system 304. For instance, the power distribution map 312 may be updated, when a subset of the plurality of power outlets 302 is turned on or off or when a condition of a power supply 216 of the servers 120 changes (e.g., reconnected to a distinct power outlet 302). The computer device 308 may detect a change of the plurality of power outlets 302, the plurality of servers 120, and associated connections, and dynamically updates the power distribution map 312. New records of PDU power plug states 318 as well as of server power states 325 may be generated, when the changes are detected. The new records may be processed by the mapping module 310 to update the power distribution map 312. The update may be implemented in a dynamic manner during an operation phase of the server system 304. For example, the computer device 308 detects a substantially low current level (e.g., equal to 0) of an output current, an increase of the output current, a disconnection of a power cord, a connection of the power cord to a first power outlet 302-1. In an example, the computer device 308 detects a change of a current level of the output current of the first power outlet 302-1, and the change exceeds a threshold current change, indicating that a distinct server 120 is electrically coupled to, and powered by, the first power outlet 302-1.

Further, in some embodiments, in response to detection of the change, the computer device 308 applies a map updating power pattern 820 to a subset of one or more power outlets 302U and monitors server power states 325 of a subset of servers 120U. The power distribution map 312 is dynamically updated for the subset of one or more power outlets 302U and the subset of servers 120U. In an example, the subset of one or more power outlets 302U includes the first power outlet 302-1 only. In another example, the subset of one or more power outlets 302U includes two or more power outlets. In an example, the subset of servers 120U includes only a first server 120-1 only. In another example, the subset of servers 120U includes two or more servers.

In some embodiments, during the setup phase of the server system 304, a first power outlet 302-1 is electrically coupled to a power supply 216-1 of a first server 120-1, and a second power outlet 302-2 is electrically coupled to a power supply 216-2 of a second server 120-2, which may include another power supply 216-3. When the power supplies 216-1 and 216-2 are swapped on the power outlets 302-1 and 302-2, the map updating power pattern 820 is applied to power off and on each of the power outlets 302-1 and 302-2 within two successive plug-off durations. Disruptions with operation of the servers 120-2 and 120-1 are detected within two successive interrupt durations, e.g., after the computer device 308 scans the server records 316 of the subset of servers 120U. The power distribution map 312 is updated to indicate that the first power outlet 302-1 is electrically coupled to the power supply 216-2 of the second server 120-2, and the second power outlet 302-2 is electrically coupled to the power supply 216-1 of the first server 120-1.

In some embodiments, a first server 120-1 is removed from the server rack 100. The map updating power pattern 820 to a subset of one or more power outlets 302U (e.g., the first power outlet 302-1 that was previously coupled to the first server 120-1, all of the power outlets 302). In accordance with a determination that a server power state of the first server 120-1 does not change in response to the map updating power pattern 820, the computer device 308 confirms that the first server 120-1 is not associated with the plurality of power outlets 302U and that the first server 120-1 is removed. When the server power state of the first server 120-1 does not change, either the first server 120-1 shows unreachable or a server power supply state shows off in records of the server power states.

In some embodiments, a second server 120-2 is disposed on the server rack 100 in place of a first server 120-1. A map updating power pattern 820 is applied to a subset of one or more power outlets 302U (e.g., the first power outlet 302-1 that was previously coupled to the first server 120-1, all of the power outlets 302). In accordance with a determination that a server power state of the second server 120-2 (not that of the first server 120-1) changes in response to the map updating power pattern 820, the computer device 308 updates the power distribution map 312, confirming that the second server 120-2 is associated with the first power outlet 302-1, which was originally coupled to the first server 120-1, in place of the first server 120-1. That said, the first server 120-1 shows unreachable, while the second server 120-2 shows reachable with a server power supply state shows on in records of the server power states.

Figure 9:
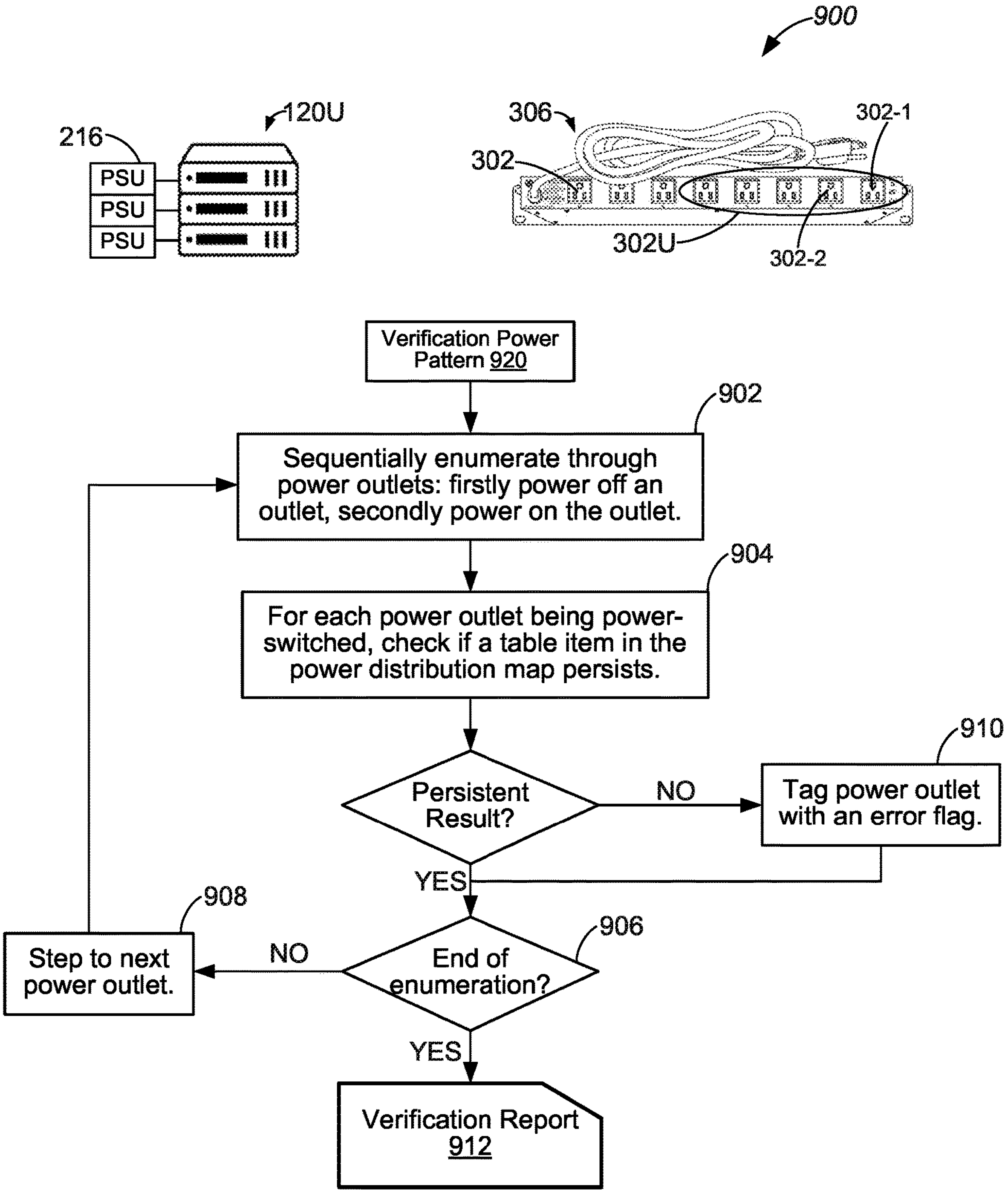
FIG. 9 is a flow diagram of an example server verification process for verifying a power distribution map of a server system, in accordance with some embodiments.

FIG. 9 is a flow diagram of an example server verification process 900 for verifying a power distribution map 312 of a server system 304, in accordance with some embodiments. The process 900 may be applied to verify the correctness of the constructed power distribution map 312. A verification power pattern 920 is applied to enumerate (operation 902) a subset of power outlets 302U sequentially. For example, each of the subset of power outlets 302 is successively powered off and powered on during a respective plug-off duration 402. In an example, the subset of power outlets 302U includes the first power outlet 302-1 only. In another example, the subset of power outlets 302U includes two or more power outlets. In yet another example, the subset of power outlets 302U includes all power outlets of the server system 304.

In some embodiments, for each of the subset of power outlets 302U, the computer device 308 identifies a respective server 120 based on a corresponding table item in the power distribution map 312 to be verified, and determines (operation 904) whether the table item persists (e.g., remains the same). In accordance with a determination that the table item corresponding to one of the subset of power outlets 302U persists, the computer device checks (operation 906) enumeration of the one of the subset of power outlets 302U, and steps (operation 908) to a next power outlet of the subset of power outlets 302U. Conversely, in accordance with a determination that the table item corresponding to the one of the subset of power outlets 302U does not persist, the computer device 308 tags (operation 910) the one of the subset of power outlets 302U with an error flag. After all of the subset of power outlets 302U is scanned and enumerated, the computer device 308 generates a verification report 912.

Figure 10:
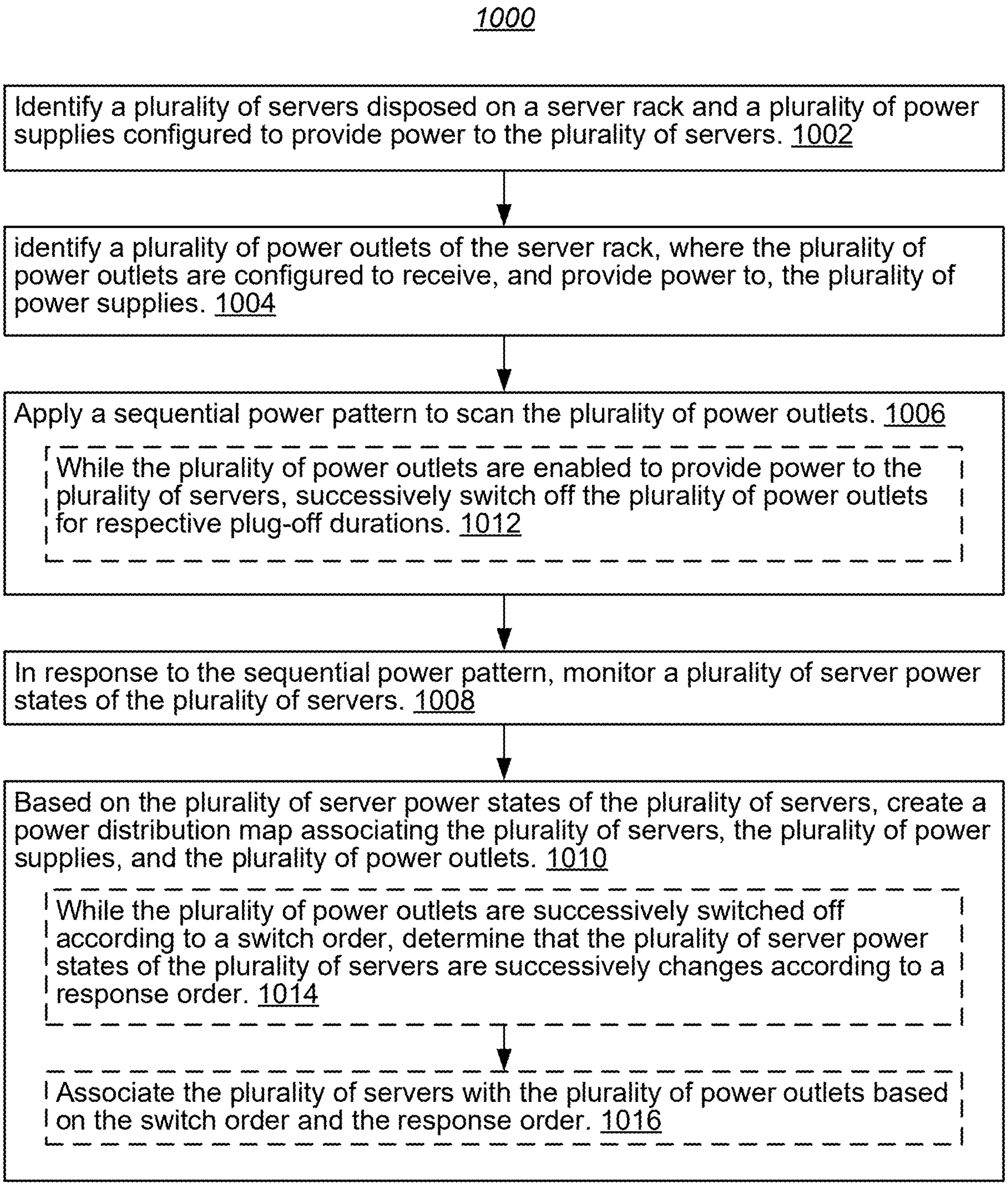
FIG. 10 is a flow diagram of an example method for managing power distribution of a server system, in accordance with some embodiments.

FIG. 10 is a flow diagram of an example method 1000 for managing power distribution in a server system 304, in accordance with some embodiments. The method 1000 may be implemented to automatically associate a plurality of servers 120 including a plurality of power supplies 216 with a plurality of power outlets 302 of a PDU 306 during both a setup phase and an operation phase of the server system 304. In some embodiments, the server system 304 is applied in a data center. In some embodiments, the method 1000 is governed by instructions that are stored in a non-transitory computer readable storage medium and are executed by one or more processors (e.g., CPU) of a computer system (e.g., including a computer device 308 in FIG. 3). Each of the operations shown in FIG. 10 may correspond to instructions stored in the computer memory or computer readable storage medium of the computer device. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or other instruction format that is interpreted by one or more processors. Some operations in the method 1000 may be combined and/or the order of some operations may be changed.

In some embodiments, the computer system identifies (operation 1002) a plurality of servers 120 disposed on a server rack 100 and a plurality of power supplies 216 configured to provide power to the plurality of servers 120. The computer system identifies (operation 1004) a plurality of power outlets 302 of the server rack 100, and the plurality of power outlets 302 are configured to receive, and provide power to, the plurality of power supplies 216. The computer system applies (operation 1006) a sequential power pattern 320 to scan the plurality of power outlets 302. In response to the sequential power pattern 320, the computer system monitors (operation 1008) a plurality of server power states 325 of the plurality of servers 120. Based on the plurality of server power states 325 of the plurality of servers 120, the computer system creates (operation 1010) a power distribution map 312 associating the plurality of servers 120, the plurality of power supplies 216, and the plurality of power outlets 302.

In some embodiments, while the plurality of power outlets 302 are enabled to provide power to the plurality of servers 120, the sequential power pattern 320 is applied to scan the plurality of power outlets 302 by successively switching off (operation 1012) the plurality of power outlets 302 for respective plug-off durations 402 (FIG. 4). Further, in some embodiments, each of the respective plug-off durations 402 is less than 10 seconds, and the respective plug-off durations 402 are included a temporal duration that is less than 10 minutes.

In some embodiments, the computer system monitors the plurality of server power states 325 of the plurality of servers 120. While the plurality of power outlets 302 are successively switched off according to a switch order, the computer system determines (operation 1014) that the plurality of server power states 325 of the plurality of servers 120 successively change and associates (operation 1016) the plurality of servers 120 with the plurality of power outlets 302 based on plurality of server power states. Further, in some embodiments, the plurality of server power states successively change according to a response order, and the plurality of servers are associated with and mapped to the plurality of power outlets based on the switch order and the response order. In some situations, after a particular outlet is switched off, a particular server turns unreachable from reachable within a first temporal duration (e.g., seconds, minutes), and is determined to be electrically coupled to and powered by the particular outlet. Conversely, in some situations, after the particular outlet is switched on, the particular server turns reachable from unreachable within a second temporal duration (e.g., seconds, minutes), or one of a plurality of power supplies of the particular server turns on from off. The particular server or one of the plurality of power supplies is determined to be electrically coupled to and powered by the particular power outlet. More details on associating and mapping PDU outputs to servers and associated power supplies are discussed above with reference to FIG. 7.

In some embodiments, while switching off two of the plurality of power outlets successively, no server is disabled from being powered. It is therefore determined that the two of the plurality of power outlets are connected to two power supplies of a first server, and a first power state of the first server is monitored in response to switching off the two of the plurality of power outlets.

In some embodiments, during a first plug-off duration, the computer system switches off two of the plurality of power outlets 302 concurrently. The two of the plurality of power outlets 302 are connected to two power supplies 216 of a first server 120-1, and a first power state of the first server 120-1 is monitored in response to switching off the two of the plurality of power outlets 302 concurrently. In some embodiments, during a first plug-off duration, switching off two of the plurality of power outlets 302 concurrently. The two of the plurality of power outlets 302 are connected to two power supplies 216 of two distinct servers 120, and two server power states 325 of the two distinct servers 120 are monitored in response to switching off the two of the plurality of power outlets 302 concurrently.

In some embodiments, each server corresponds to one or more power supplies 216 and has a respective power state including one or more power supply states 324 of the one or more power supplies 216. For each server, the power distribution map 312 identifies a server identification 326, a reachability state (e.g., represented by a server availability 322), a power supply count 323 (e.g., a total number of the one or more power supplies), and a power supply state array 508 including the one or more power supply states 324. Further, in some embodiments, the power supply state array 508 includes a Boolean array in a size equal to the power supply count 323 (e.g., a total number of the one or more power supplies).

In some embodiments, each of the plurality of power outlets 302 has a power plug state 318 (FIG. 3) including one of (1) not plugged 318A and (2) plugged 318B with one of a plurality of power factors.

In some embodiments, the power distribution map 312 identifies a power plug state, a server identification 326, a power supply count 323, a power supply state array 508 including one or more power supply states 324 of the one or more power supplies 216, and an operating system state 328.

In some embodiments, the plurality of power outlets 302 are coupled to a power distribution unit (PDU) 306. In some embodiments, the computer system executes a power distribution application, including reporting the plurality of server power states 325 by the plurality of servers 120 and reporting a plurality of power plug states 318 by the PDU.

In some embodiments, the computer system detects a change of the plurality of power outlets 302, the plurality of servers 120, and associated connections, and dynamically updating the power distribution map 312. Further, in some embodiments (e.g., associated with FIG. 8), in response to detection of the change, the computer system applies a map updating power pattern 820 to a subset of one or more power outlets 302U, and monitors server power states 325 of a subset of servers 120U, the power distribution map 312 is dynamically updated for the subset of one or more power outlets 302U and the subset of servers 120U.

In some embodiments (e.g., associated with FIG. 8), the computer system determines that a first server 120-1 is removed from the server rack 100, applies a map updating power pattern 820 to a subset of one or more power outlets 302U, and updates the power distribution map 312, confirming that the first server 120-1 is not associated with the plurality of power outlets 302 and that the first server 120-1 is removed.

In some embodiments (e.g., associated with FIG. 8), the computer system determines that a second server 120-2 is disposed on the server rack 100 in place of a first server 120-1, applies a map updating power pattern 820 to a subset of one or more power outlets 302U, monitors at least a second server 120-2 power state of the second server 120-2, and updates the power distribution map 312, confirming that the second server 120-2 is associated with one or more power outlets 302 originally coupled to the first server 120-1. Under some circumstances, the mapping of servers with their power supplies and PDU outlets have already been established during an operation phase of a server system 304. An update of the power distribution map 312 may be implemented to replace a server 120 by substituting information of a replaced server with information of a replacing server or by switching off a power outlet connected to the replaced server and switching on the power outlet connected to the replacing server.

In some embodiments, the power distribution map 312 is created automatically and without user intervention based on the plurality of server power states 325 of the plurality of servers 120.

In some embodiments, a first server 120-1 includes two power supplies 216 identified by a single IP address, and in accordance with the power distribution map 312, a first power supply 216-1 (FIG. 3) has an active state for providing power to the first server 120-1 and a second power supply 216-2 has a standby state.

In some embodiments, a first server 120-1 includes two power supplies 216 identified by two distinct IP addresses, and in accordance with the power distribution map 312, the two power supplies 216 have active states for providing power jointly.

It should be understood that the particular order in which the operations in FIG. 10 have been described are merely exemplary and are not intended to indicate that the described order is the only order in which the operations could be performed. One of ordinary skill in the art would recognize various ways to manage signal timing on a serial data interface as described herein. Additionally, it should be noted that details of other processes described herein with respect to other figures (e.g., FIGS. 1-9) are also applicable in an analogous manner to method 1000 described above with respect to FIG. 10. For brevity, these details are not repeated here.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for managing power distribution in a server system, comprising:

identifying a plurality of servers disposed on a server rack and a plurality of power supplies configured to provide power to the plurality of servers;

identifying a plurality of power outlets of the server rack, wherein the plurality of power outlets are configured to receive, and provide power to, the plurality of power supplies;

applying a sequential power pattern to scan the plurality of power outlets;

in response to the sequential power pattern, monitoring a plurality of server power states of the plurality of servers; and based on the plurality of server power states of the plurality of servers, creating a power distribution map associating the plurality of servers, the plurality of power supplies, and the plurality of power outlets.

2. The method of claim 1, wherein applying the sequential power pattern to scan the plurality of power outlets further comprising, while the plurality of power outlets are enabled to provide power to the plurality of servers:

successively switching off the plurality of power outlets for respective plug-off durations.

3. The method of claim 2, wherein each of the respective plug-off durations is less than 10 seconds, and the respective plug-off durations are included a temporal duration that is less than 10 minutes.

4. The method of claim 2, wherein monitoring the plurality of server power states of the plurality of servers further comprises:

while the plurality of power outlets are successively switched off according to a switch order, determining that the plurality of server power states of the plurality of servers successively change; and associating the plurality of servers with the plurality of power outlets based on the plurality of server power states.

5. The method of claim 4, wherein the plurality of server power states successively change according to a response order, and the plurality of servers are associated with and mapped to the plurality of power outlets based on the switch order and the response order.

6. The method of claim 2, wherein successively switching off the plurality of power outlets further comprises:

while switching off two of the plurality of power outlets successively, determining that no server is disabled from being powered; and determining that the two of the plurality of power outlets are connected to two power supplies of a first server, wherein a first power state of the first server is monitored in response to switching off the two of the plurality of power outlets.

7. The method of claim 1, wherein:

each server corresponds to one or more power supplies and has a respective power state including one or more power supply states of the one or more power supplies;

for each server, the power distribution map identifies a power plug state of a respective power outlet, a server identification of the respective server, a total number of the one or more power supplies, a power supply state array including one or more power supply states of the one or more power supplies, and an operating system state of the respective server.

8. The method of claim 7, wherein the power supply state array includes a Boolean array in a size equal to the total number of the one or more power supplies.

9. The method of claim 1, wherein each of the plurality of power outlets has a power plug state including one of (1) not plugged and (2) plugged with one of a plurality of power factors.

10. The method of claim 1, wherein the power distribution map identifies a power plug state, a server identification, a power supply count, a power supply state array including one or more power supply states of one or more power supplies, and an operating system state.

11. The method of claim 1, wherein the plurality of power outlets are coupled to a power distribution unit (PDU), the method further comprising:

executing a power distribution application, including reporting the plurality of server power states by the plurality of servers and reporting a plurality of power plug states by the PDU.

12. A computer system, comprising:

one or more processors; and memory having instructions stored thereon, which when executed by the one or more processors cause the processors to perform operations comprising:

identifying a plurality of servers disposed on a server rack and a plurality of power supplies configured to provide power to the plurality of servers;

identifying a plurality of power outlets of the server rack, wherein the plurality of power outlets are configured to receive, and provide power to, the plurality of power supplies;

applying a sequential power pattern to scan the plurality of power outlets;

in response to the sequential power pattern, monitoring a plurality of server power states of the plurality of servers; and based on the plurality of server power states of the plurality of servers, creating a power distribution map associating the plurality of servers, the plurality of power supplies, and the plurality of power outlets.

13. The computer system of claim 12, further comprising instructions for:

detecting a change of the plurality of power outlets, the plurality of servers, and associated connections; and dynamically updating the power distribution map.

14. The computer system of claim 13, further comprising instructions for, in response to detection of the change:

applying a map updating power pattern to a subset of one or more power outlets; and monitoring power states of a subset of servers, the power distribution map is dynamically updated for the subset of one or more power outlets and the subset of servers.

15. The computer system of claim 12, further comprising instructions for:

determining that a first server is removed from the server rack;

applying a map updating power pattern to a subset of one or more power outlets; and updating the power distribution map, including confirming that the first server is not associated with the plurality of power outlets and that the first server is removed.

16. The computer system of claim 12, further comprising instructions for:

determining that a second server is disposed on the server rack in place of a first server;

applying a map updating power pattern to a subset of one or more power outlets;

monitoring at least a second server power state of the second server; and updating the power distribution map, including confirming that the second server is associated with one or more power outlets originally coupled to the first server.

17. A non-transitory computer-readable storage medium, having instructions stored thereon, which when executed by one or more processors of a computer system cause the processors to perform operations comprising:

identifying a plurality of servers disposed on a server rack and a plurality of power supplies configured to provide power to the plurality of servers;

identifying a plurality of power outlets of the server rack, wherein the plurality of power outlets are configured to receive, and provide power to, the plurality of power supplies;

applying a sequential power pattern to scan the plurality of power outlets;

in response to the sequential power pattern, monitoring a plurality of server power states of the plurality of servers; and based on the plurality of server power states of the plurality of servers, creating a power distribution map associating the plurality of servers, the plurality of power supplies, and the plurality of power outlets.

18. The non-transitory computer-readable storage medium of claim 17, wherein the power distribution map is created automatically and without user intervention based on the plurality of server power states of the plurality of servers.

19. The non-transitory computer-readable storage medium of claim 17, wherein a first server includes two power supplies identified by a single IP address, and in accordance with the power distribution map, a first power supply has an active state for providing power to the first server and a second power supply has a standby state.

20. The non-transitory computer-readable storage medium of claim 17, wherein a first server includes two power supplies identified by two distinct IP addresses, and in accordance with the power distribution map, the two power supplies have active states for providing power jointly.

* * * * *